(12) United States Patent
Pendergast et al.

(10) Patent No.: US 10,681,071 B1
(45) Date of Patent: Jun. 9, 2020

(54) ENRICHMENT AND ANALYSIS OF CYBERSECURITY THREAT INTELLIGENCE AND ORCHESTRATING APPLICATION OF THREAT INTELLIGENCE TO SELECTED NETWORK SECURITY EVENTS

(71) Applicant: ThreatConnect, Inc., Arlington, VA (US)

(72) Inventors: Andrew Pendergast, Columbia, MD (US); Andrew Gidwani, Jessup, MD (US); Daniel Cole, Fairfax, VA (US); Jason Spies, Clifton, VA (US); Bhaskar Karambelkar, Ashburn, VA (US); Christopher Johnson, Matthews, NC (US); Danny Tineo, Charlotte, NC (US)

(73) Assignee: ThreatConnect, Inc., Arlington, VA (US)

( * ) Notice: Subject to any disclaimer, the term of this patent is extended or adjusted under 35 U.S.C. 154(b) by 339 days.

(21) Appl. No.: 15/667,303

(22) Filed: Aug. 2, 2017

Related U.S. Application Data

(60) Provisional application No. 62/370,219, filed on Aug. 2, 2016, provisional application No. 62/446,255, filed on Jan. 13, 2017.

(51) Int. Cl.
*H04L 9/00* (2006.01)
*H04L 29/06* (2006.01)

(52) U.S. Cl.
CPC ...... *H04L 63/1425* (2013.01); *H04L 63/1433* (2013.01)

(58) Field of Classification Search
CPC ............ H04L 63/1425; H04L 63/1433; H04L 63/1416; H04L 63/20; H04L 63/1441;
(Continued)

(56) References Cited

U.S. PATENT DOCUMENTS

| 8,776,241 B2 | 7/2014 | Zaitsev |
| 9,565,204 B2 | 2/2017 | Chesla |

(Continued)

OTHER PUBLICATIONS

M. Shashanka, M. Shen and J. Wang, "User and entity behavior analytics for enterprise security," 2016 IEEE International Conference on Big Data (Big Data), Washington, DC, 2016, pp. 1867-1874.*

(Continued)

*Primary Examiner* — Alexander Lagor
(74) *Attorney, Agent, or Firm* — Faegre Drinker Biddle & Reath LLP

(57) ABSTRACT

Techniques are disclosed which can provide an orchestrated response to a cybersecurity threat. This orchestrated response may be based upon, at least in part, a reputation score. Threat model(s) may be received that identify cybersecurity threat(s). An indication of observations, false positives, and/or page views for the threat may be obtained. Data feeds may be received including known good data feeds, known bad data feeds, and enrichment data feeds. The data feeds may provide information about one or more indicators of compromise (IOC). For each IOC, a weighted criticality score may be determined. The weighted criticality score may be mapped to a corresponding point value. An aggregated score may be determined based upon at least the corresponding point value. A reputation score may be computed, and in some configurations, provided to a user.

18 Claims, 15 Drawing Sheets

(58) Field of Classification Search
CPC ............... H04L 63/145; H04L 63/1408; H04L 63/1458; H04L 63/1466
See application file for complete search history.

(56) References Cited

U.S. PATENT DOCUMENTS

| | | |
|---|---|---|
| 2007/0162890 A1 | 7/2007 | Meier et al. |
| 2008/0168529 A1 | 7/2008 | Anderson et al. |
| 2015/0033341 A1* | 1/2015 | Schmidtler ......... H04L 63/1425 726/23 |
| 2015/0288712 A1 | 10/2015 | Jones et al. |

OTHER PUBLICATIONS

Korean Intellectual Property Office, International Search Report and Written Opinion for International Application No. PCT/US2019/059656, dated Apr. 8, 2020.

* cited by examiner

ENRICHMENT AND ANALYSIS OF CYBERSECURITY THREAT INTELLIGENCE AND ORCHESTRATING APPLICATION OF THREAT INTELLIGENCE TO SELECTED NETWORK SECURITY EVENTS

CROSS REFERENCE TO RELATED APPLICATIONS

This application claims priority to U.S. Provisional Patent Application No. 62/370,219, which was filed on Aug. 2, 2016, and U.S. Provisional Patent Application No. 62/446,255, which filed on Jan. 13, 2017, the entire contents of which is incorporated herein by reference.

BACKGROUND

Conventionally, networks utilize Security Information and Event Management (SIEM) systems that provide analysis of security alerts to be used by end user network security analysts. The alerts may be provided in response to a cybersecurity threat or event such as a ransomware attack, code exploit, distributed denial of service attack, malware, and the like. These SIEM systems can gather and store this security alert information in historical logs that may be used to track security events and determine trends. Nevertheless, while these conventional SIEM systems can be effective in generating alerts and identifying risks, they require network security analysts to determine an appropriate security action in response to such alerts. Further, these alerts may not be sufficient for a network security analyst to take an appropriate response, and the analyst may be required to investigate further the alert by obtaining and examining cybersecurity threat intelligence data from other sources.

Threat intelligence can refer to evidence-based knowledge, including context, mechanisms, indicators, implications, and actionable advice, about an existing or emerging menace or hazard to assets that can be used to inform decisions regarding the subject's response to that menace or hazard. Threat data can refer to a list of malicious domains, a file hash, websites, Internet Protocol (IP) addresses, and other indicators of compromise (IOCs). However, without an understanding of context, relevance, accuracy, or known association, the meaning of a single indicator or data point is difficult to obtain, and it is unlikely that an appropriate response or next action can be mounted in response to a potential threat event. In view of the growing number of cybersecurity events, the rapidity by which such events can produce deleterious effects on a network, and the limited number of qualified network security analysts, the time for adequately responding to security events on the network using such conventional SIEM systems is slowing to the point where network security could be compromised.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

SUMMARY OF THE INVENTION

Figure 1:
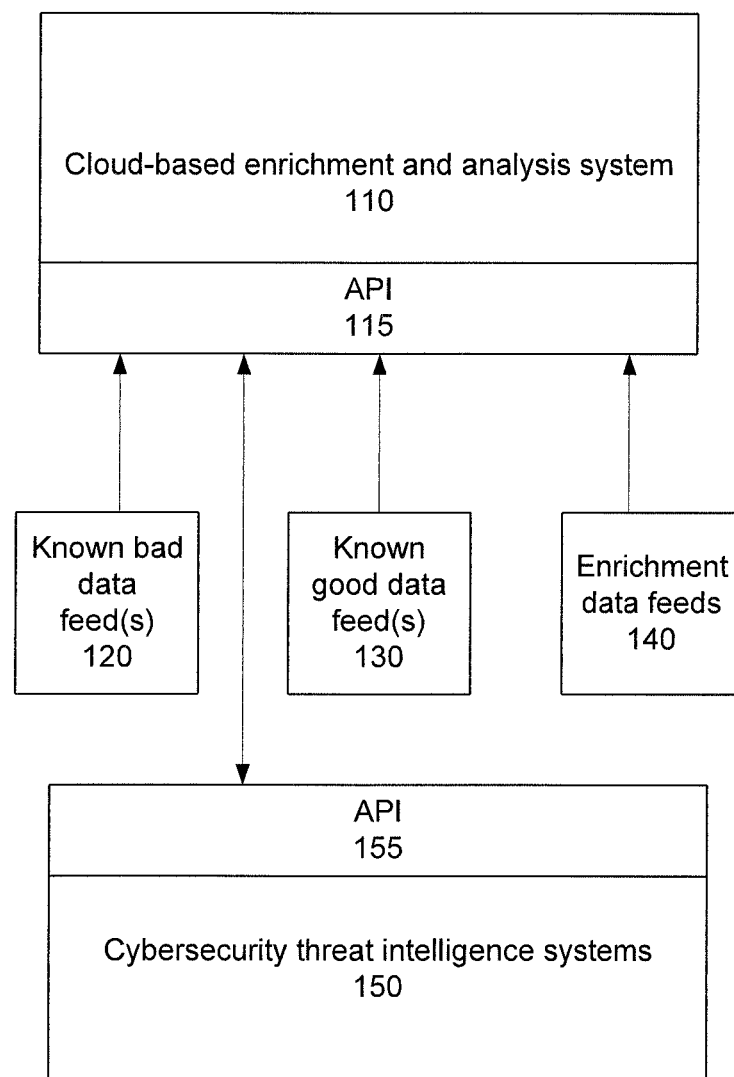
FIG. 1 is an example architecture for a system according to the implementations disclosed herein.

In an implementation a system is disclosed that may include a non-transitory memory that is coupled to one or more hardware processors. The memory may be configured to store at least threat model data. The one or more processors may be configured to read instructions from the non-transitory memory to cause the system to perform operations. At least one threat model may be received over a communication network that identifies a cybersecurity threat. An indication of a number of observations, a number of false positives, and a number of page views for the cybersecurity threat identified in the at least one threat model may be obtained. One or more data feeds may be received over the communication network. The data feeds may include one or more of a known bad data feed that constitute known cybersecurity threats, one or more known good data feed that do not constitute known cybersecurity threats, and one or more enrichment data feeds. The one or more data feeds may include one or more IOCs. For each IOC, a weighted criticality score may be determined, and the weighted criticality score may be mapped to a corresponding point value. An aggregated score that may include at least the corresponding point value may be determined. A reputation score may be determined as the product of a scale factor and the aggregated score, divided by a maximum point total. The reputation score may be provided and/or displayed to a user of the system.

In an implementation, the aforementioned processes may be implemented on a non-transitory computer readable medium having stored thereon computer readable instructions that are executable to cause one or more processors to perform the operations.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

DETAILED DESCRIPTION

Based upon the foregoing discussion, it may be advantageous to orchestrate a response to a security event when possible to free up qualified network security analysts for higher priority tasks related to previously unknown cybersecurity threats and improve overall response time to cybersecurity events. Orchestrating a response to a cybersecurity threat constitutes a transformation of key data associated with a threat into an effective action by processing the data in a way that generates a response according to predetermined parameters. One such approach is collecting a plurality of threat models, and storing the plurality of threat models for later use in scoring and classifying future threat models. The collected threat models may also be integrated and/or analyzed with other data feeds from external for analyzing and responding to new cybersecurity threats. Accordingly, it is desirable to provide a novel enrichment and analysis of cybersecurity threat intelligence system, which may be cloud-based, that accounts for and augments threat models based prior threat models and external sources. A threat model may be generated from a process that assesses a risk of a cybersecurity threat. The process may include (1) an indication of what is included/excluded from the analysis (e.g., scope), (2) collection of detailed data about real cyber incidents (e.g., malicious URLs, phishing attempts, etc.), (3) a risk assessment as to whether the existing defenses are sufficient to mitigate or prevent the threat and/or to what extent are users/systems vulnerable to the threat, and (4) an action may be undertaken to detect and/or mitigate the threat as assessed by parts 1-3 of the process.

Disclosed are techniques which can include a system for cloud-based enrichment and analysis of cybersecurity threat intelligence. In an implementation, the system may assimilate, correlate, and/or assess various threat models and/or other data feeds to generate an aggregated understanding of one or more IOCs in a threat model, including, for example a threat rating, a confidence rating, and/or a context of the threat being assessed. The system may provide users with an understanding of an indicator's general reputation, specific risk to the organization of the user, and/or a relation to current or past threats. A user may refer to cybersecurity experts such as a network engineer or the like, who may oversee or manage security of a network and/or computing systems connected thereto, as well as an analyst, leadership, and management in fields such as Threat Intelligence, Incident Response, Risk Management, etc.

The system may collect individual instances of threat models, and provide such threat models based on cross-instance observations and false positive reporting from other threat models The system may be configured to store reputation data from multiple "data services" to be brokered to each threat model instance. This may improve efficiency of collection and storage, and may create a centralized repository for all observation, false positive data, external reputation data, and whitelist data from all threat model instances. The centralized data may also be used for analytics for input and/or definition of a reputation score.

The system may provide the capability and associated infrastructure for a "Universal Whitelist" and may enable many other analytics for cross-instance delivery in the future. The system may, for example, aggregate observations and false positive ratios by the cybersecurity industry and/or other organizations.

For each threat, such as an IOC, a threat model may be generated, and actionable intelligence of the threat model may be enriched with a reputation, including good and/or bad data points, and background data. The reputation of the threat and background information of the threat, such as WHOIS data, a DNS history, may enable analysts to prioritize other threats and incidents related to the threat being analyzed.

The consolidation of cybersecurity intelligence data may provide a significant advantage to cybersecurity threat models. The consolidated data may be vetted by different customers and/or users of the system and may provide more useful and more relevant information about the threat. The above and below described centralized platform may also be scaled for long term, high volume storage needs. Customers and users of the platform may also benefit by being able to see information that was previously unknown or inaccessible. This can improve the quality of a threat model, which provides an opportunity to orchestrate an appropriate cybersecurity response based on predetermined parameters, thereby reducing the need for analyst and improving response time. For example, the disclosed system may output a reputation score which can be used to deliver an appropriate response automatically.

Search/query/view metrics may be used on the analyzed data to gauge customer/user interactions with the platform and may provide data driven decisions. Users may use these metrics to study the data to develop more detailed data points. These metrics may then be analyzed by the platform to provide even more contextual data. Further, customer/user feedback in terms of observations, confirmation/disputation, and social like/unlike may add another dimension to the analyzed data. For example, in some configurations, a machine learning algorithm or classifier may be applied to threat data and/or metrics.

Cloud-Based Enrichment and Analysis System

FIG. 1 is an example architecture for a system according to the implementations disclosed herein. As shown in FIG. 1, a cloud-based enrichment and analysis system 110 may be operably connected to an application program interface (API) for the cloud 115. An API may refer to a set of routines, protocols, and/or tools for a software application. An API may specify how software components may interact. The cloud system 110 may receive, via the cloud API 115, known bad data feeds 120 from external data sources, known good data feeds 130 from external data sources, and enrichment data feeds 140 from external data sources.

A data feed may refer to receipt of data from a source by which the data can be updated in real-time. Known bad data feeds 120 may include, for example, a blacklist and/or a malicious uniform resource locator (URL) data feed. For example, a known bad data feed may be published online and provide a targeted collection of known malicious sites. Such known bad data feeds may be added via partnerships with other cybersecurity organizations, discovered via open source research, etc. Known good data feeds 130 and enrichment data feeds 140 may include, for example, a whitelist, Google's safe browsing site status list, and/or Alexa's top 1000 global sites list. Known good data feeds may be published online and provide a targeted collection of known benign indicators. The cloud-based enrichment and analysis system 110 may receive, via the API 115, threat models from one or more cybersecurity threat intelligence system 150, which is operably connected to its own API 155. The cybersecurity threat intelligence system may provide a user with analytics regarding one or more threat models, data from the data feeds, data pertaining to IOCs, current and/or previous trigger events, an indication of threats for the user's organization, an interface for a user to configure an orchestrated response to one or more threats, an indication of attack patterns of cybersecurity threats, etc. The API 155 of the cybersecurity threat intelligence system may also receive the known bad data feeds 120 received by the cloud-based enrichment and analysis system. The cloud-based enrichment and analysis system 110 may transmit a reputation score, for example, to the cybersecurity threat intelligence system 150, as a part of a threat model.

Figure 2:
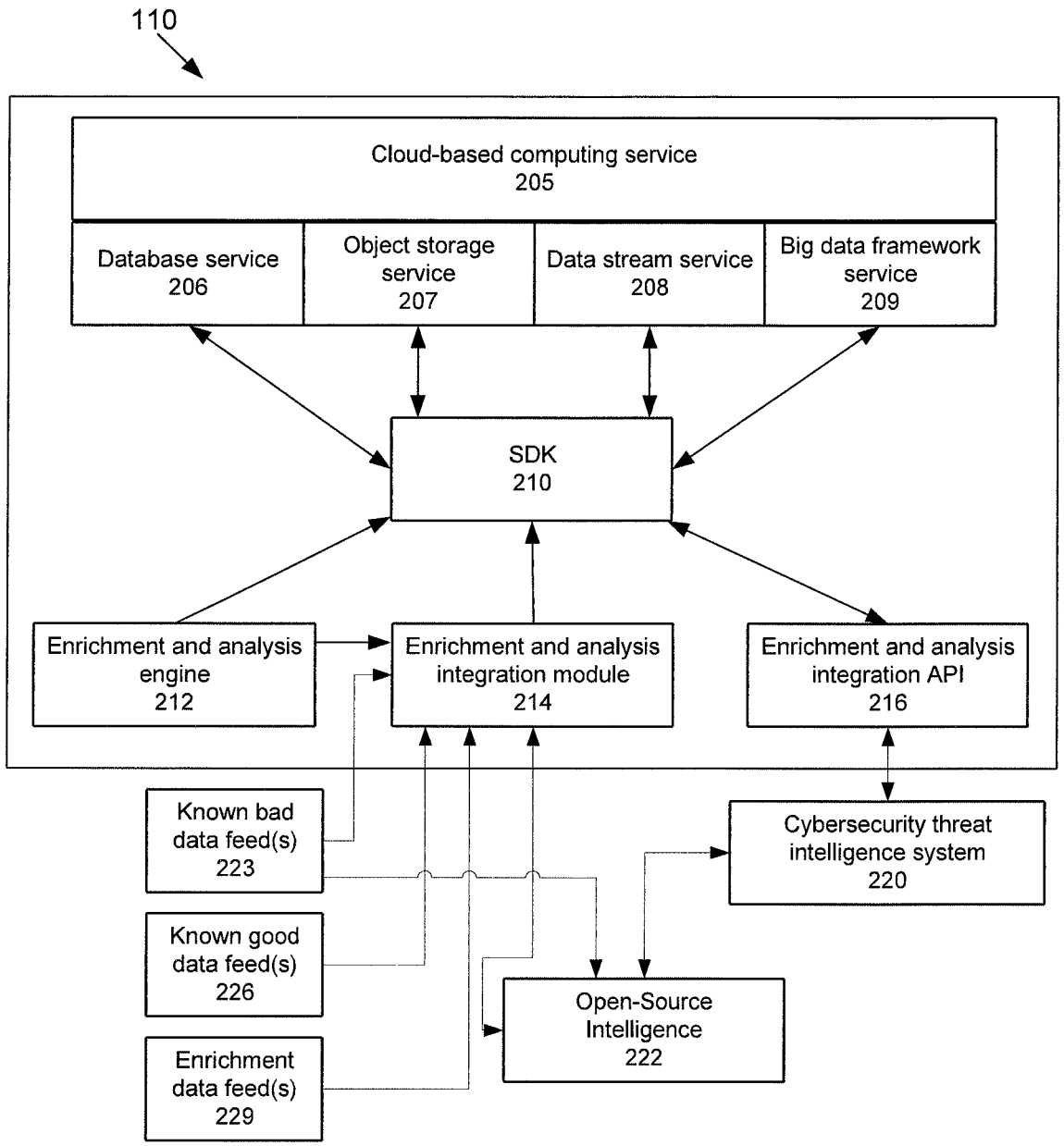
FIG. 2 is an example of the cloud-based enrichment and analysis system according to an implementation disclosed herein.

FIG. 2 is an example of the cloud-based enrichment and analysis system according to an implementation disclosed herein. The cloud-based enrichment and analysis system 110 may include various modules that may be operably connected to one another or to external sources by an API. A cloud-based computing service 205, such as Amazon Web Services (AWS), may refer to a virtual cluster of computers that have high availability (e.g., available all the time) through the Internet and that have attributes of a real computer including a central processing unit (CPU) or processor, graphical processing unit (GPU), RAM, machine readable storage, an operating system, one or more applications, etc. The cloud-based computing service 205 may include a database service 206, such as Amazon DynamoDB, which can provide a service based upon throughput rather than a storage amount. The database service 206 can allow information to be more accessible for retrieval patterns of end users. The cloud-based computing service 205 may include an object storage service 207, such as Amazon S3, which can refer to storage provided through a web service, and which can provide interoperability between computer systems on the Internet. The cloud-based computing service 205 may include a data stream service 208, such as Amazon Kinesis, which may refer to an intake of data in real-time such as application logs, website clickstreams, etc. into a database. The data received may be processed and analyzed in real time. For example, streaming data can be analyzed. The object storage service 207 and the data stream service may manage transmission of data between the big data framework service 209 and the database service 206 via the SDK 210. The cloud-based computing service 205 may include a big data framework service 209, such as Amazon Elastic MapReduce, which may provide a framework for distributed processing of large data sets across clusters of computers. The big data framework service 209 may run, for example, at period time periods, and conduct operations, such as MapReduce, and store the processed data feeds in the database service.

A cloud-based enrichment and analysis software development kit (SDK) 210, may refer to a set of software development tools that allows the creation of applications for a certain software package, framework, hardware platform, computer system, etc. The SDK 210 may be operably connected to one or more of the cloud-based computing service 205, a cloud-based enrichment and analysis engine 212, and/or a cloud-based enrichment and analysis integration module 214, via an API. The SDK 210 may be operably connected to a cloud-based enrichment and analysis API 216. The SDK 210 may utilize a common codebase and may be provided in any programming language such as Java, Scala, C #, etc. The cloud-based enrichment and analysis integration module 214 may normalize and/or standardize disparate formats so that the cloud-based enrichment and analysis engine 212 can make statements via the API 216. The statements may include, for example, analytics, a threat model, a reputation score, etc. that can be provided or displayed to a user via the cybersecurity threat intelligence system 220.

The cloud-based enrichment and analysis system 110 may receive and/or transmit a one or more threat models and/or metadata (e.g., data information, information about sources, etc.) that inform decision making (e.g., whether to deprecate the data, trust level, etc.) from/to one or more of a cybersecurity threat intelligence system 220, which is operably connected to open-source intelligence 222, via the API of the cloud-based enrichment and analysis system 216. An modified threat model may be sent to the cybersecurity threat intelligence system 216 as well. The cloud-based enrichment and analysis system 110 may receive known bad data feeds 223 from external data sources, known good data feeds 226 from external data sources, and enrichment data feeds 229 from external data sources, via the cloud-based enrichment and analysis integration module 214. The API of the cybersecurity threat intelligence system may also receive the known bad data feeds received by the cloud-based enrichment and analysis system.

Figure 3:
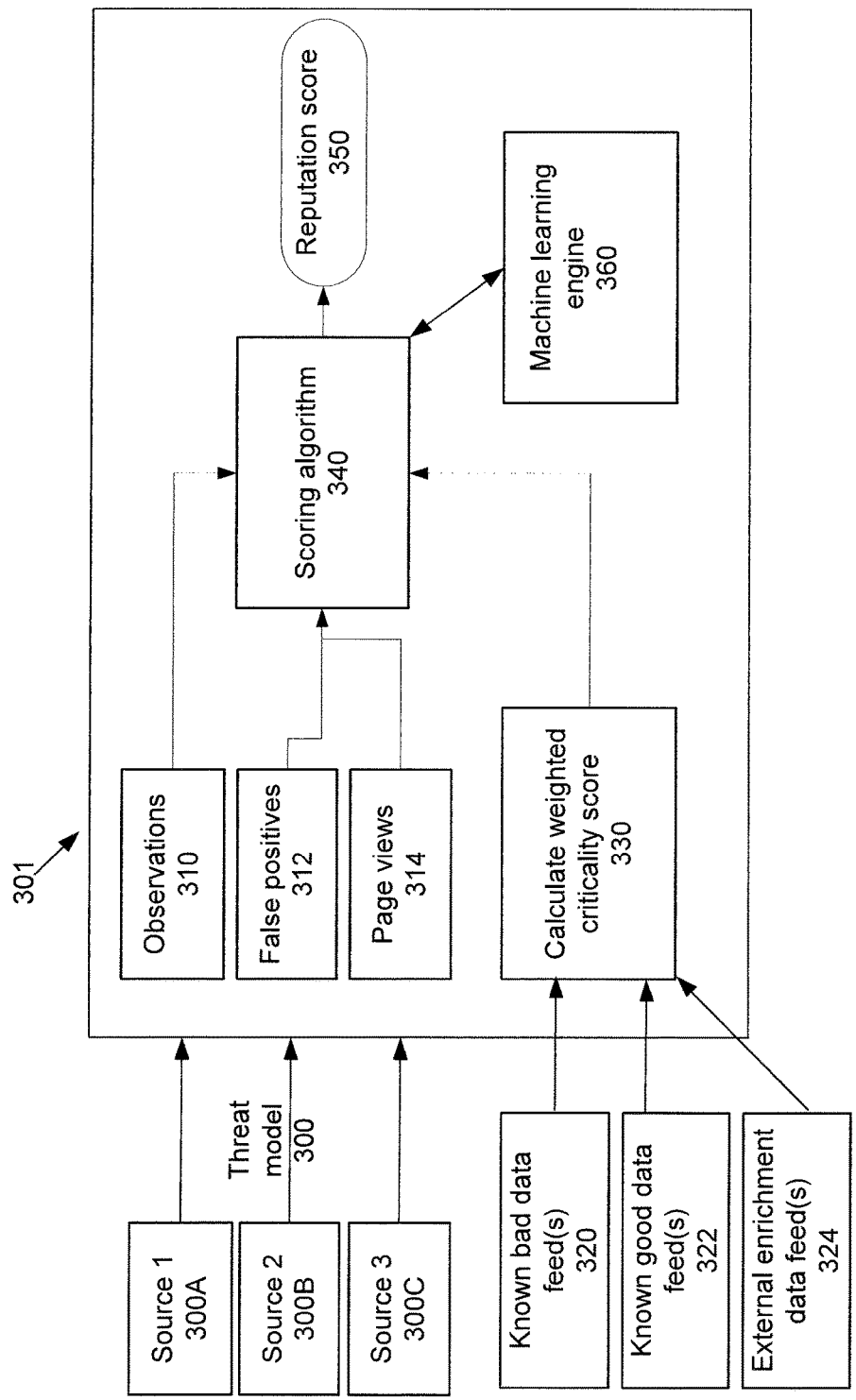
FIG. 3 shows an example configuration of different data sources and processing thereof by the system according to embodiments of the present disclosure.

FIG. 3 shows an example configuration of different data sources and processing thereof by the system according to embodiments of the present disclosure. A threat model 300 pertaining to a specific threat may be received into the cloud-based enrichment and analysis system 301, for example, by the cybersecurity threat intelligence system. Upon receiving the threat model 300, the cloud-based enrichment and analysis system 301 may assess the threat based on one or more of observations 310, false positives 312, and page views 314 related to the threat. Observations 310 may refer to how often the threat has been observed in the past, and the timeliness of the observation. False positives 312 may refer to a threat that is benign or expected behavior that has been identified as anomalous or malicious. For example, an innocuous indicator such as google.com may be incorrectly identified as malicious. It may be indicated as a false positive by a user of the system. Page views 314 may refer to how often users of the cloud-based enrichment and analysis system 301 view the threat. For example, a threat model may be received that identifies a threat that has been previously identified and for which the system has at least some data about the threat (e.g., observations, false positives, page views, a reputation score, etc.). The new threat model may be analyzed based upon the observation, false positive, and page view data for the threat, and any additional information from the new threat model may be utilized to update the system. In the event that the threat model pertains to a brand new threat, i.e., the system has no information about the threat, then default values and coefficients may be utilized in the algorithm to convey to a user that the system is aware of and/or monitoring the threat. As additional information about the new threat is accumulated, the system may be updated.

For example, individual threat models 300 may refer to a given threat and be obtained from a variety of different sources 300A, 300B, 300C. At a specified frequency (e.g., every day, every 12 hours, beginning at 8:00 AM GMT daily, etc.), individual threat models 300 that have been collected by the system 301 may be analyzed based upon at least the observations 310, false positives 312, and/or page views 314. The system 301 may specify a variety of IOCs such as a file hash, IP address, domain, URL, email address, etc. and a configurable number of days in which such information about the indicator may be utilized in analysis. For example, there may be an observation cut-off of 500 days for considering a file hash indicator for the observation and false positive information, but the cut-off may be 100 days for the page view information. The system 301 may also have a default value for IOCs that are new or that do not otherwise have a specified cut-off. Each indicator may have a different cut-off specified, and each cut-off may be different for the observation 310, false positive 312, and page view data 314. Table 1 provides an example of the cut-offs for each type of information for each indicator. There may be many more indicators than the ones identified in Table 1, and not all of the indicators in Table 1 need to be used.

TABLE 1

| IOC | Observations cut-off (days) | False positive cut-off (days) | Page view cut-off (days) |
|---|---|---|---|
| File hash | 500 | 500 | 100 |
| IP address | 10 | 10 | 10 |
| Domain | 10 | 50 | 100 |
| URL | 100 | 100 | 100 |
| Email address | 100 | 75 | 100 |
| Default | 7 | 7 | 7 |

The disclosed system may also receive information about known bad feeds 320, known good feeds 322, and external enrichment sources 324 as described earlier. With regard to known bad data feeds 320, there may be an associated default threat rating and confidence values for each feed, which may be determined based upon analyst judgment and mathematical validation against known ground truth datasets. In some instances, a data feed may provide a threat rating and/or confidence equivalent that may be used if it is available. Similarly, the dates upon which a bad data feed 320 was uploaded/reuploaded may be stored in the system 301 and have an associated cut-off time after which the data are no longer considered for analysis similar to the IOCs based upon the threat models shown in Table 1. Each source of a known bad data feed 320 may be assigned a trust level, which could be on a scale of 0 to 10, for example. Trust level may be determined based on analyst judgment and mathematical validation. Each known bad data feed source 320 may be assigned two parameters for confidence deprecation as disclosed herein. If a source has multiple IOCs, then these values can be assigned per IOC.

An IOC's confidence rating may be computed to deprecate over time (e.g., with each day, each hour, or other specified time period/frequency) since its last update. This may occur for each IOC and per the source. A deprecated confidence value may be the initial confidence value multiplied by the deprecation factor (df). The initial confidence value may refer to the value that was assigned to the IOC when it was last updated. For each passing unit of time (e.g., day, hour, etc.) when the IOC has not been updated, the confidence value from the last updated point may be utilized instead of the previous unit of time's value (e.g., day, hour, etc.). A deprecation factor, df, may be computed by the following formula:

$$df = \frac{1}{1 + e^{-\alpha(M+1-x-\beta)}} \qquad \text{Formula 1}$$

In the above formula, α may refer to the deprecation rate, which can be configured in the system such as being defined by analyst judgment and mathematical validation. A lower deprecation rate (e.g., 0 or 1 being low) may cause faster deprecation. β may refer to the deprecation range (e.g., 0 or 1 being low), which can be configured in the system. It can be computed as the difference between the minimum and maximum values for the range. Thus, a higher value for deprecation range may be indicative of a larger range. The time cut-off number, M, can refer to the specified unit of time measurement (e.g., weeks, days, hours, etc.) after which the deprecated confidence is set to zero. The term χ may refer to the difference between the current unit of time measurement (e.g., the current day, current hour, etc.) and the amount of time since the last update measured in the same units (e.g., days, hours, etc.). According to Formula 1, if χ>M, then df is 0, which indicates that the confidence in the specified IOC is zero. If χ is not 0, then df is computed as 1, which means the IOC should not be deprecated. The deprecation factor may be computed for the known bad data sources 320.

As stated above, the deprecation factor can be per source or per IOC type. Formula 1 can be flexible to allow fast deprecation of ephemeral IOCs (e.g., a file hash), and slow or no deprecation of stable IOCs (e.g., a domain). Table 2 provides examples of default values that may be assigned for various IOCs. Other values may be used and may be configured to suit a particular user's desired level of security. As above, the default value may be utilized where an IOC is new or otherwise does not specify some or all of the parameters (e.g., α, β, and/or M).

TABLE 2

| IOC | A | β | M |
|---|---|---|---|
| File hash | Do not deprecate | Do not deprecate | Do not deprecate |
| IP address | 0.5 | 0.7 | 7 |
| Domain | 0.8 | 0.3 | 30 |
| URL | 0.8 | 0.3 | 30 |
| Email address | 0.8 | 0.3 | 30 |
| Default | 0.5 | 0.5 | 7 |

As illustrated in FIG. 3, the external sources may also include known good feeds 322. For certain IOCs, the criticality score as disclosed below, may be set to zero. For example, any or all of the IOCs shown in Table 2 may be set to zero for known good data feeds 322. Thus, if an IOC is completely deprecated or is a good known good indicator, then it may receive a value of 0, which may effectively remove it from consideration by the weighted criticality score algorithm disclosed herein. In some instances, an IOC may be deprecated, but not completely deprecated. Such a value can be utilized in Formula 2.

The external enrichment data 324 may not receive a score. For example, external enrichment data may contain information that a particular IOC is a part of the Amazon EC2 cloud hosting infrastructure. The external enrichment data may not be inherently good or bad but may be useful to help resolve whether an unknown indicator should be considered good or bad. The external enrichment data may be utilized to modulate the reputation score in the scoring algorithm 340 as well as the criticality score, as determined by the inference ruleset engine 660. For example, the reputation score may be decremented slightly, but not to zero, for an IOC that is known to exist in Amazon's hosting environment because the IOC is largely less benign than other hosting options for adversaries.

The calculated weighted criticality score 330, according to Formula 2 for a given IOC per source. As stated above, IOCs that are a part of known good data feeds 322 may receive a score of zero. For each known bad data feed 320, the confidence may be deprecated as disclosed earlier based upon the deprecation parameters of the specific source for each IOC type as described with regard to computation of the deprecated confidence value. The threat rating and the deprecated confidence value may be used to determine the IOC's criticality score per source. The criticality score may refer to a value that conveys the severity of a threat of a particular indicator based upon its innate nature. For example, the criticality score may have a predefined range of 0-650 (other ranges may be utilized) and a severe threat such as ransomware may receive a value of 650 while a known good indicator may receive a score of 0. Thus, the criticality score may be computed by mapping the threat rating and deprecated confidence through a nonlinear mathematical function. A weighted criticality score for each IOC may be computed as disclosed in Formula 2:

$$CS_W = \frac{\sum_{i=1}^{N} CS_i * STL_i}{\sum_{i=1}^{N} STL_i} \quad \text{Formula 2}$$

In Formula 2, N may refer to the total number of sources, $CS_i$ may refer to the criticality score of the IOC source, i, $STL_i$ may refer to the trust level of source i. For example, an IOC for A may have two different sources, s1 and s2. For the first source, $CS_i$ may be 2 and $STL_i$ may be 6. For s2, $CS_i$ may be −1 and $STL_i$ may be 2. Thus, $CS_W$ for both sources for IOC A may be computed as $((2*6)+(-1*2))/(6+2)$. Each new source may have a trust level in a range of, for example, at least 1 (least trusted) to at most 10 (fully trusted).

Figure 4:
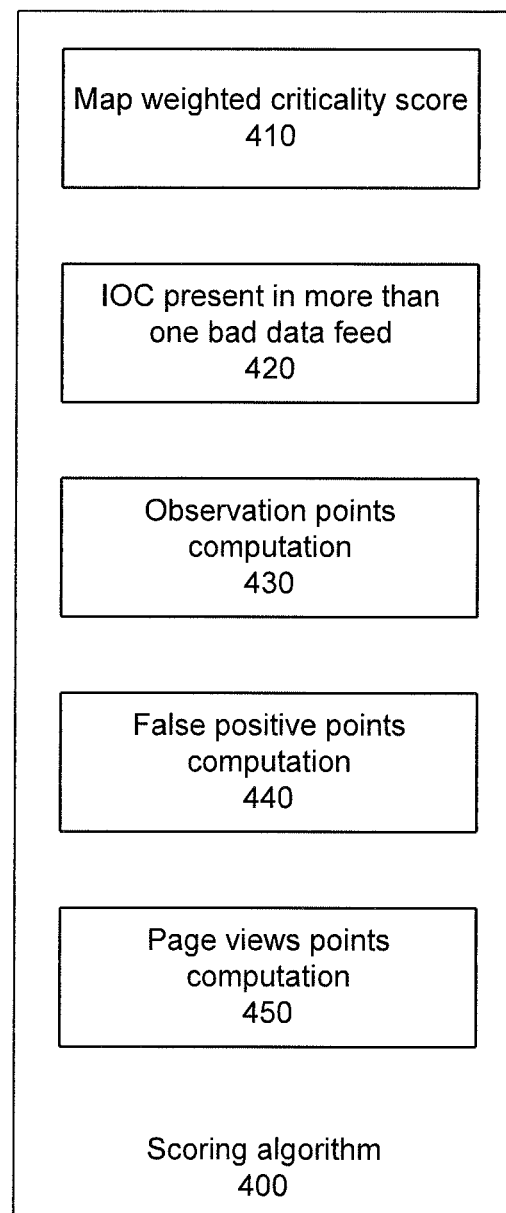
FIG. 4 is an example of the processes performed by the scoring algorithm according to an implementation disclosed herein.

A scoring algorithm may assimilate the weighted criticality score with the information obtained from the threat models (e.g., 310, 312, 314). FIG. 4 is an example of the processes performed by the scoring algorithm according to an implementation disclosed herein. The weighted criticality score for each IOC may be scaled or mapped to a particular range at 410. For example, a score of −2 may be mapped or scaled to zero, a score of −1 may be mapped or scaled to a value of 100, a score of 0 may be mapped or scaled to a value of 250, a score of 1 may be mapped or scaled to a value of 400, a score of 2 may be mapped or scaled to a value of 650. An IOC that is not in the known bad data feeds 320, may be assigned a default value such as 250 (e.g., unknown). The mapping may be configurable such that the values may be different than those mentioned specifically here, and additional values may be incorporated or removed from the mapping. The scoring algorithm may determine at 420 whether an IOC is present in more than one bad data feed 320. If so, the algorithm may add a value to the total score such as an additional 100 points. The threat model data that were received, 310, 312, 314 may also be analyzed by the algorithm. The number of points awarded based upon the observations, false positives, and page views may be computed as follows:

$$\log_{10}(\text{number of observations since the cut-off date}+1)*100 \quad \text{Formula 3}$$

$$\log_{10}(\text{number of false positives since the cut-off date}+1)*100 \quad \text{Formula 4}$$

$$\log_{10}(\text{number of page views since the cut-off date}+1)*100 \quad \text{Formula 5}$$

The number of points based upon Formulas 3-5 may have each have an upper limit such as 500, 250, or 50. Similarly, there may be a maximum number of points for the weighted criticality score such as 650. The scoring algorithm 340 may then sum the points awarded for the weighted criticality, an IOC being in multiple bad data feeds, and Formulas 3-5 to obtain an aggregated score. The reputation score 350 may be computed as (the aggregated score*1000)/the maximum aggregated score. The maximum aggregated score may be the sum of the maximum number of points awarded in Formulas 3-5, plus the award for being present in multiple bad data feeds, and the maximum criticality points. Thus, the reputation score may be scaled between 0 and 1000. The disclosed implementations are not limited to this particular scale. The closer to zero that a reputation score is, the more reputable or credible the threat may be considered. The reputation score for the threat may be provided to a user of the cloud-based enrichment and analysis system. For example, a user may interface with an API of the system using a computing device (e.g., laptop, tablet, etc.) and request a computation of the reputation score for a threat. The system may return an indication of the reputation score, as well as other information related to the reputation score including, but not limited to, the received threat models, page views, false positive, observations, known good and bad data feeds, external enrichment data, etc. The reputation score may be a component of a modified threat model, along with other information that can display to a user the aggregated data for a given threat. The modified threat model may be sent to users of the system or displayed to users via the cloud-based system.

Figure 5A:
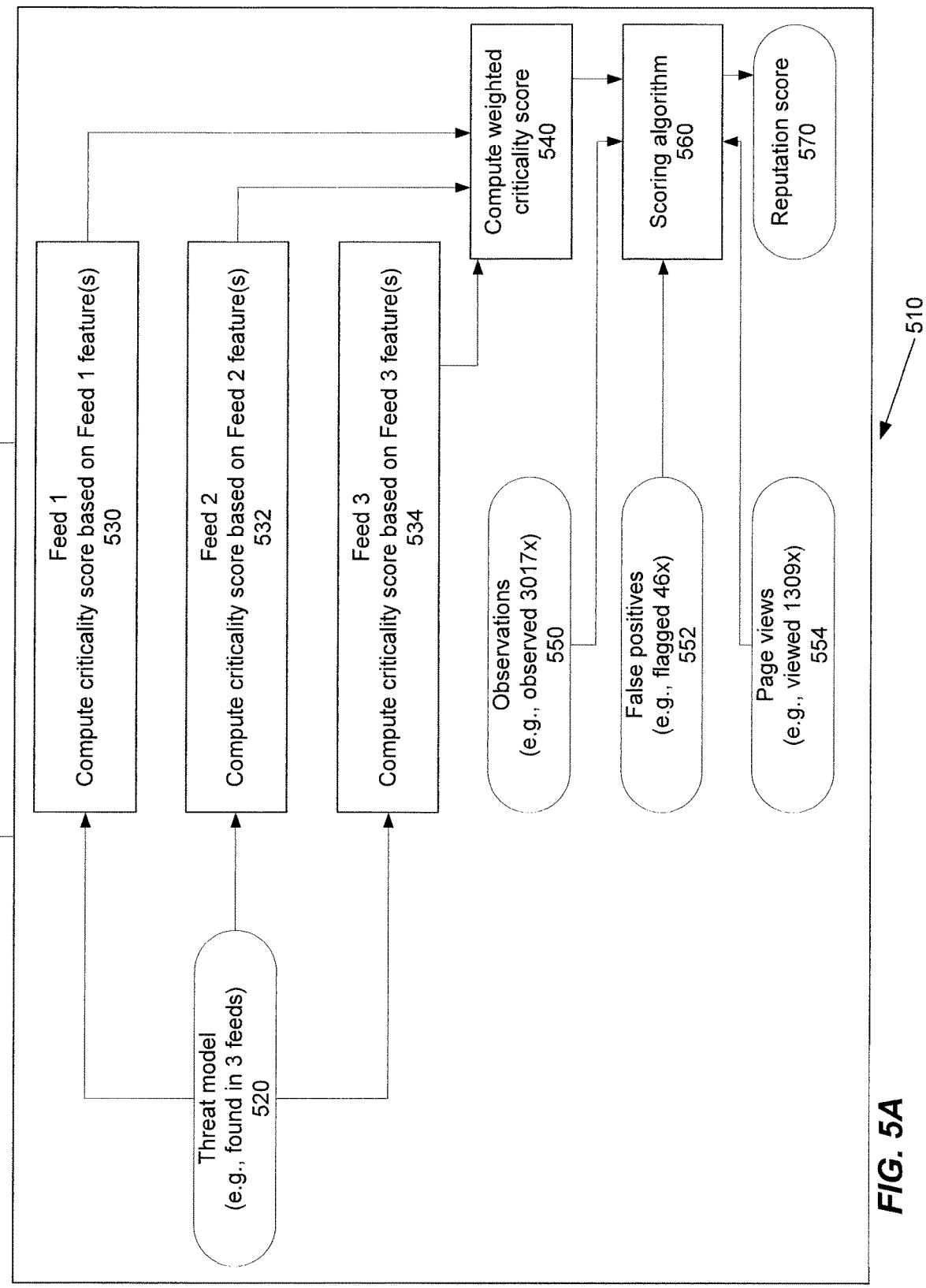
FIG. 5A illustrates an example of a reputation score based upon previously assessed threats and data feeds from external data sources using a method for enrichment and analysis of cybersecurity threat intelligence, according to embodiments of the present disclosure.

FIG. 5A illustrates an example of a reputation score based upon previously assessed threats and data feeds from external data sources using a method for enrichment and analysis of cybersecurity threat intelligence, according to embodiments of the present disclosure. In the exemplary embodiment, a threat may be assessed by the cloud-based enrichment and analysis system 510. The threat in the exemplary embodiment may be identified in a threat model 520 that is detected in three bad data feeds 530, 532, 534 which can provide information on known bad data as described earlier. For each of the data feeds 530, 532, 534 in which the threat has been found, a criticality score may be calculated based on a feature associated with each data feed 530, 532, 534 and the threat being assessed. A combined weighted criticality score 540 may be calculated based on each of the data feed criticality scores in which the threat is assessed. For example, the combined weighted criticality score may be 601 for the threat being assessed. The combined weighted criticality score 540 may then be scored with a scoring algorithm 560 as described earlier, along with one or more of observations 550, false positives 552, and page views 556, as described above, related to the threat being assessed. Continuing this example, the threat may have been observed 3,017 times, flagged as a false positive 46 times, and viewed 1,309 times. With the combined weighted criticality score 540 and the one or more of observations 550, false positives 552, and page views 554 related to the threat, a scoring algorithm 560 may be used to compute a reputation score 570 of the threat. In this example, the maximum aggregated score is 1550 based upon maximum thresholds of 650 for the mapped criticality score, 100 points for the IOC being present in multiple feeds, 500 points for the observations, 250 points for the false positives, and 50 points for the page views. The computed value for observations is $\log_{10}(3017+1)*100$ (or 348); for false positives is $\log_{10}(46+1)*50$ (or 83.6); and for page views $\log_{10}(1309+1)*10$ (or 31.2). When these values are summed with the 100 points for the threat being present in multiple feeds, as well as the computed weighted criticality score value of 601, the value is 1163. The reputation score 570 can be computed as (1163*1000)/1550 or approximately 750.

Figure 5B:
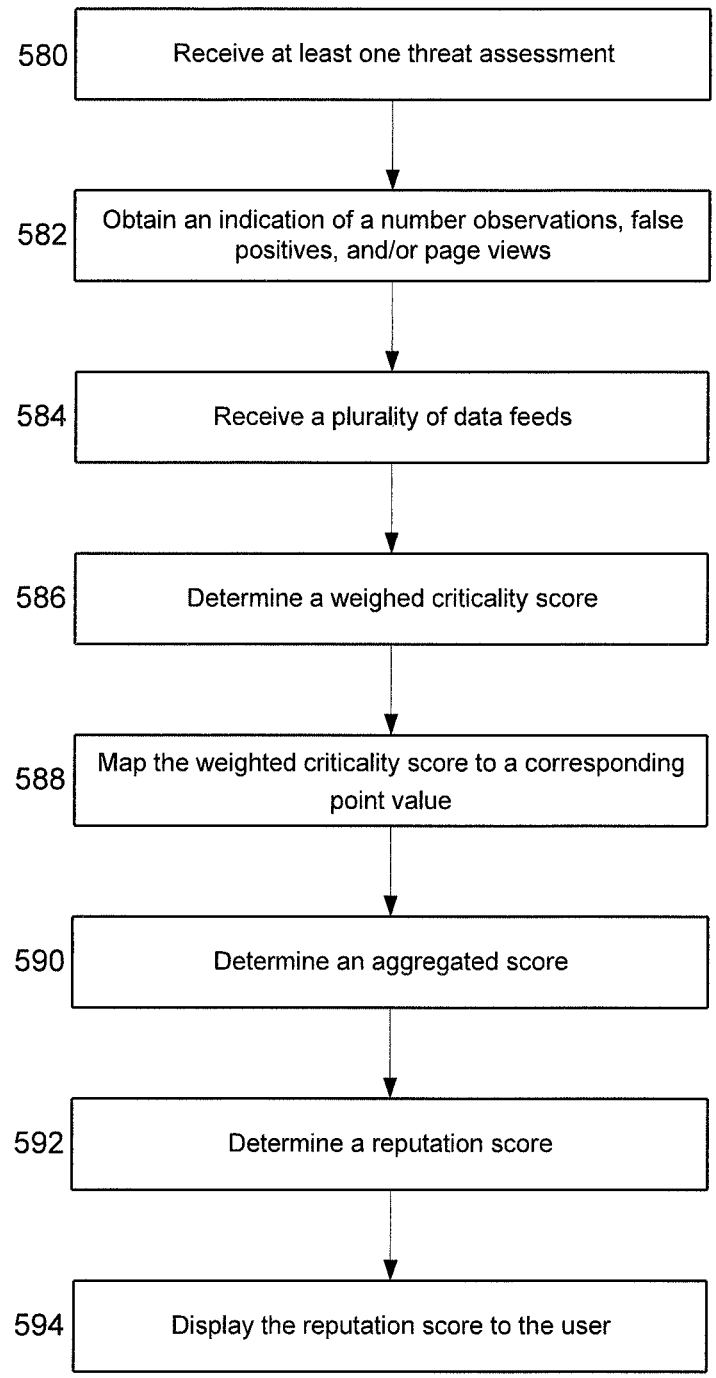
FIG. 5B is an example of the processes performed to obtain a reputation score according to implementations disclosed herein.

FIG. 5B is an example of the processes performed to obtain a reputation score according to implementations disclosed herein. At 580, at least one threat model which identifies a cybersecurity threat may be received over a communications network. The communication network may refer to the Internet, for example. As disclosed above, the threat model may identify a cybersecurity threat. At 582, an indication of a number of observations, a number of false positives, and a number of page views for the cybersecurity threat identified in the at least one threat model may be obtained. For example, in FIG. 4A, there were 1309 page views for the threat at 554. One or more data feeds may be received over the communication network at 584. As described earlier, the data feeds may include one or more of a known bad data feed that constitute known cybersecurity threats, one or more known good data feed that do not constitute known cybersecurity threats, and one or more enrichment data feeds. The data feeds may include one or more IOCs. For each IOC, a weighted criticality score may be computed at 586. This score may be computed as described earlier with regard to Formula 2. The weighted criticality score may be mapped to a corresponding point value at 588. For example, the weighted criticality score may return integers on a scale of –5 to 5, including 0. For each integer, a corresponding point value may be assigned. A weighted criticality of –1 may be assigned 300 points and while 1 may be assigned 450 points. An aggregated score that includes at least the corresponding point value may be determined at 590. As described above, points may be accumulated based upon the weighted criticality score, whether an IOC is present in multiple data feeds, and the number of instances for one or more of the observations, false positives, and page views. A reputation score may be computed at 592 as the product of a scale factor and the aggregated score, divided by a maximum point total. The reputation score may be provided to a user at 594 in response to a request, or displayed as a part of a dashboard that is provided when the user logs into the system to review threat models/cybersecurity threats.

Figure 6:
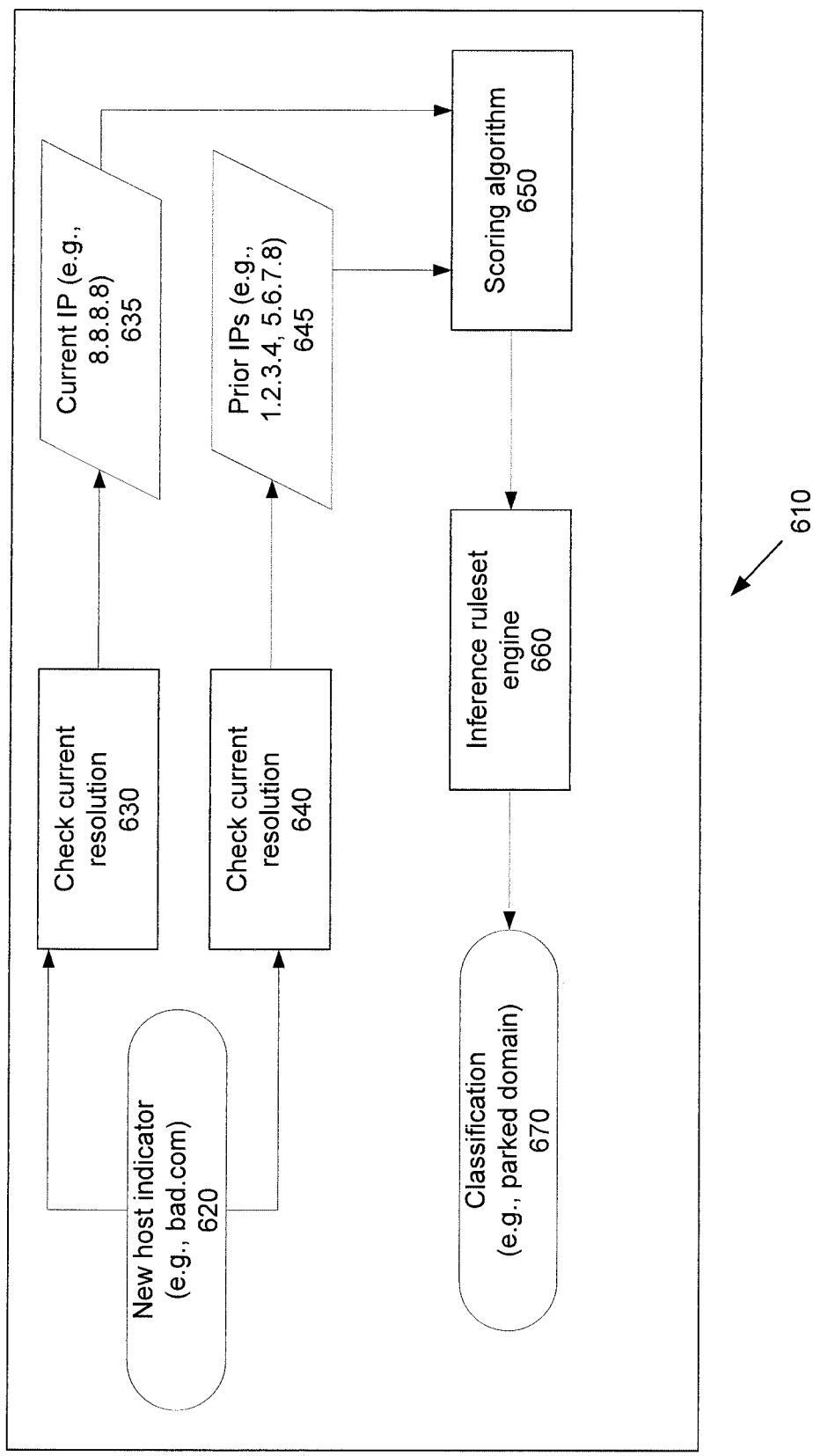
FIG. 6 illustrates an example classification of a threat based on previously assessed threats and data feeds from external data sources using a method for enrichment and analysis of cybersecurity threat intelligence, according to embodiments of the present disclosure.

FIG. 6 illustrates an example classification of a threat based on previously assessed threats and data feeds from external data sources using a method for enrichment and analysis of cybersecurity threat intelligence, according to embodiments of the present disclosure. In the exemplary embodiment, a threat may be classified by the cloud-based enrichment and analysis system 610. The current resolution of IP address for the URL received from the host indicator 620 may be determined at 630 such as by querying a server of a domain name system or obtaining the resolution from a third party service that maintains such information. The threat, in this example, may have a URL of bad.com, and it may be classified using the cloud-based enrichment and analysis system 610. For example, the URL, bad.com, may be resolved to a currently mapped IP address, which may be 8.8.8.8 at 635. The historical resolutions of the URL, bad.com, may also be determined at 640. In this example, the URL may be historically mapped IP addresses 1.2.3.4, 5.6.7.8, etc. at 645. The classification/scoring algorithm 650 may then classify the currently mapped IP address, and separately, the historically mapped IP addresses. The currently mapped IP address may be classified as a good IP address and the historically mapped IP addressed may be classified as bad IP addresses. For each of the classifications of the currently mapped IP address and the historically mapped IP addresses, the cloud-based enrichment and analysis system 610 may apply an inference ruleset engine 660, which may be based on machine learning/language processing and other previous threat models. For example, a classifier may be trained on a data set that includes known good or known bad indicators. As a part of the training, features associated with good or bad indicators may be extracted and applied to new indicators to classify the indicator as a good or bad indicator. The inference ruleset engine may then determine that the URL, bad.com, is currently a parked domain at a good IP address. The classification algorithm may also determine that the URL, bad.com, is a temporarily using a good IP address at 670.

In some configurations, the reputation score may provide a basis for an orchestrated response as described below. For example, in the event that the reputation score is a above a certain threshold or in a predetermined range, it may generate an alert for an analyst (e.g., an email, text, automated telephone message, etc.) that the threat requires the analyst's attention. The Playbook that corresponds to the orchestrated response may pause in such instances. In some instances, the reputation score may be within a specified range for which the system may be configured to automatically take action(s) corresponding to the orchestrated response for handling threats.

Playbook

As described earlier, it may be advantageous to orchestrate a response to a security threat when possible to allow a network security analyst to concentrate on higher priority tasks related to previously unknown cybersecurity threats, and improve overall response time to such threats. As disclosed herein, a threat "Playbook" may be used. The Playbook may codify a particular network's security plan and automatically set a given response for a particular threat type and value. The Playbook can also integrate a number of applications for analyzing and responding to cybersecurity threats. A Playbook can be limited where (1) it does not have appropriate access to a wide array of threat intelligence sources, and (2) it has an inability to respond to alerts that are unknown, requiring the intervention of a network security analyst. The latter deficiency can be particularly damaging for zero day attacks that are undocumented in other threat intelligence sources. Accordingly, it is desirable to provide a novel SIEM system that accounts for and augments a Playbook's capabilities.

By automating security responses and updates based upon the reputation score and/or other threat intelligence information provided/analyzed by the above system, the orchestrated process disclosed herein can leverage existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Figure 7:
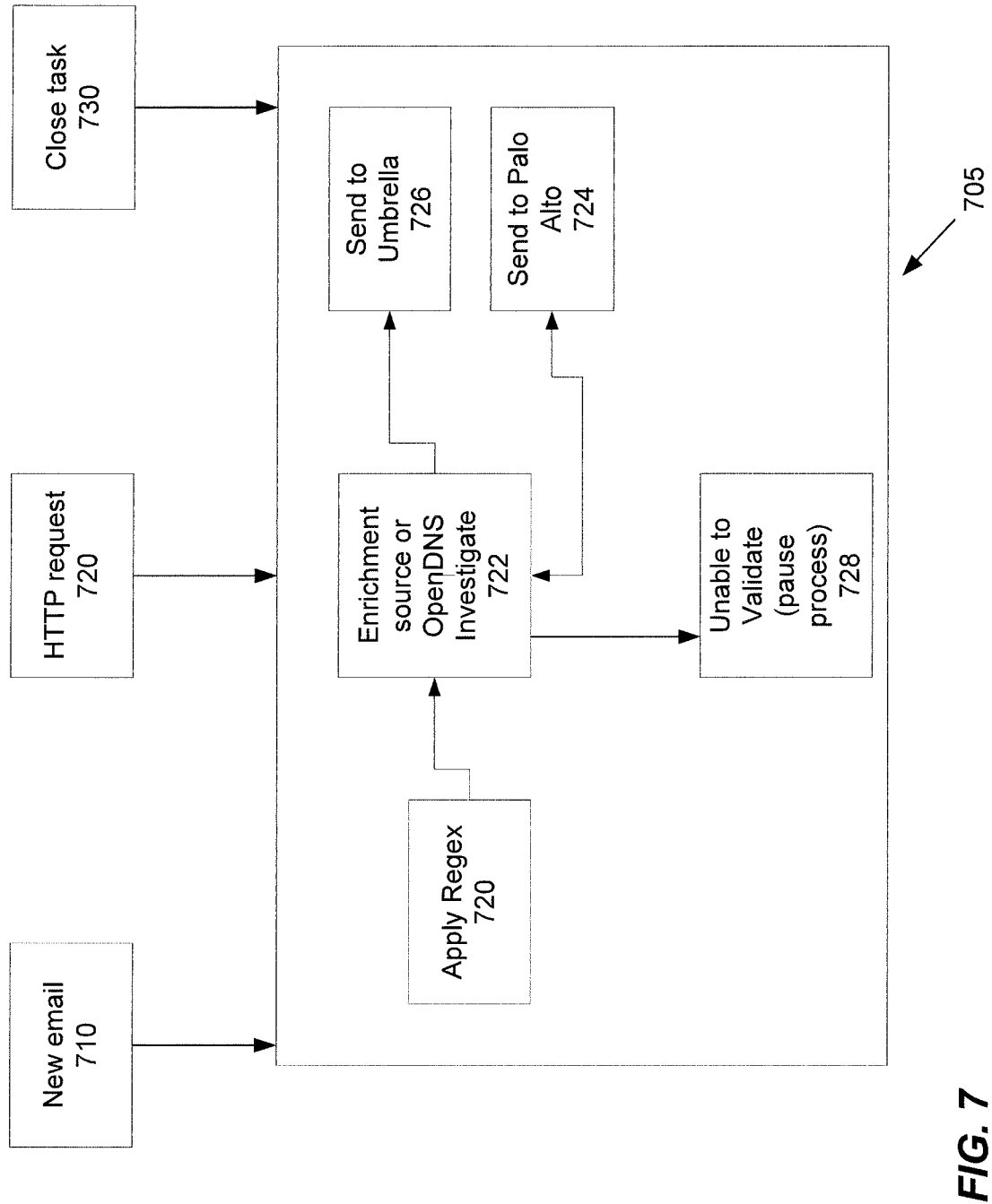
FIG. 7 illustrates an example overview of a schematic for orchestrating a response to a cybersecurity threat event as disclosed herein.

FIG. 7 illustrates an example overview of a schematic for orchestrating a response to a cybersecurity threat event as disclosed herein. A network administrator can configure the threat event that will trigger execution of the orchestrated cybersecurity response. Examples of a threat event can be a new email 710, an HTTP request 712, or closing a task 714. The orchestrated SIEM system 705 disclosed herein can include applying a RegEx ("Regular Expression") filter 720 to parse text and pull out identifying information from which a particular security threat may be assessed. In the case of email or an HTTP request 712, for example, domain or host names may be extracted for analysis. The extracted data can then be compared or analyzed using known repositories or sources of cybersecurity threat intelligence such as an enrichment source and/or OpenDNS Investigate 722 to determine whether the host is malicious or otherwise poses an unacceptable security risk. For example, a reputation score may be considered an enrichment source, and may provide an indication of whether an indicator is malicious. One or more such sources of intelligence regarding cybersecurity threats can be used in the orchestrated process.

If the host is confirmed or validated as a threat, for example based upon the reputation score computed as described earlier is within a range indicating that it is a confirmed threat and/or OpenDNS Investigate, the orchestrated process can automatically send the host to a number of security defense applications according to the desired Playbook, such as a firewall or security-service that pushes out a security update to all devices in the network regarding the threat. Examples of such defense applications are firewalls from Palo Alto Networks 724 and the cloud-based network security service such as Umbrella or the like 726 from OpenDNS. The validation of a threat can also be used to update sources of intelligence regarding cybersecurity threats to make the orchestrated process more efficient and improve automated responses to cybersecurity threats.

If the enrichment source and/or OpenDNS Investigate 722 or other threat intelligence product cannot validate 728 the threat, the orchestrated process is paused so that a network security analyst can assess the threat independently. The system may, for example, send an alert or notice (e.g., an email, text, etc.) to the analyst. If the analyst validates the threat, the host may then be processed in the same orchestrated manner by updating threat intelligence sources and implementing the security response as is done when the threat is automatically determined based on prior threat intelligence. Previously, analysts may have been informed about unknown hosts with an alert or email creating a task order. But in the previous conventional SIEM systems, the task was no longer within the response process of the SIEM system and the determination could not be seamlessly integrated into the network defense application. As disclosed herein, the network security analyst's validation of a cybersecurity threat may be processed according to the Playbook and cause an automated or orchestrated network security response.

Figure 8:
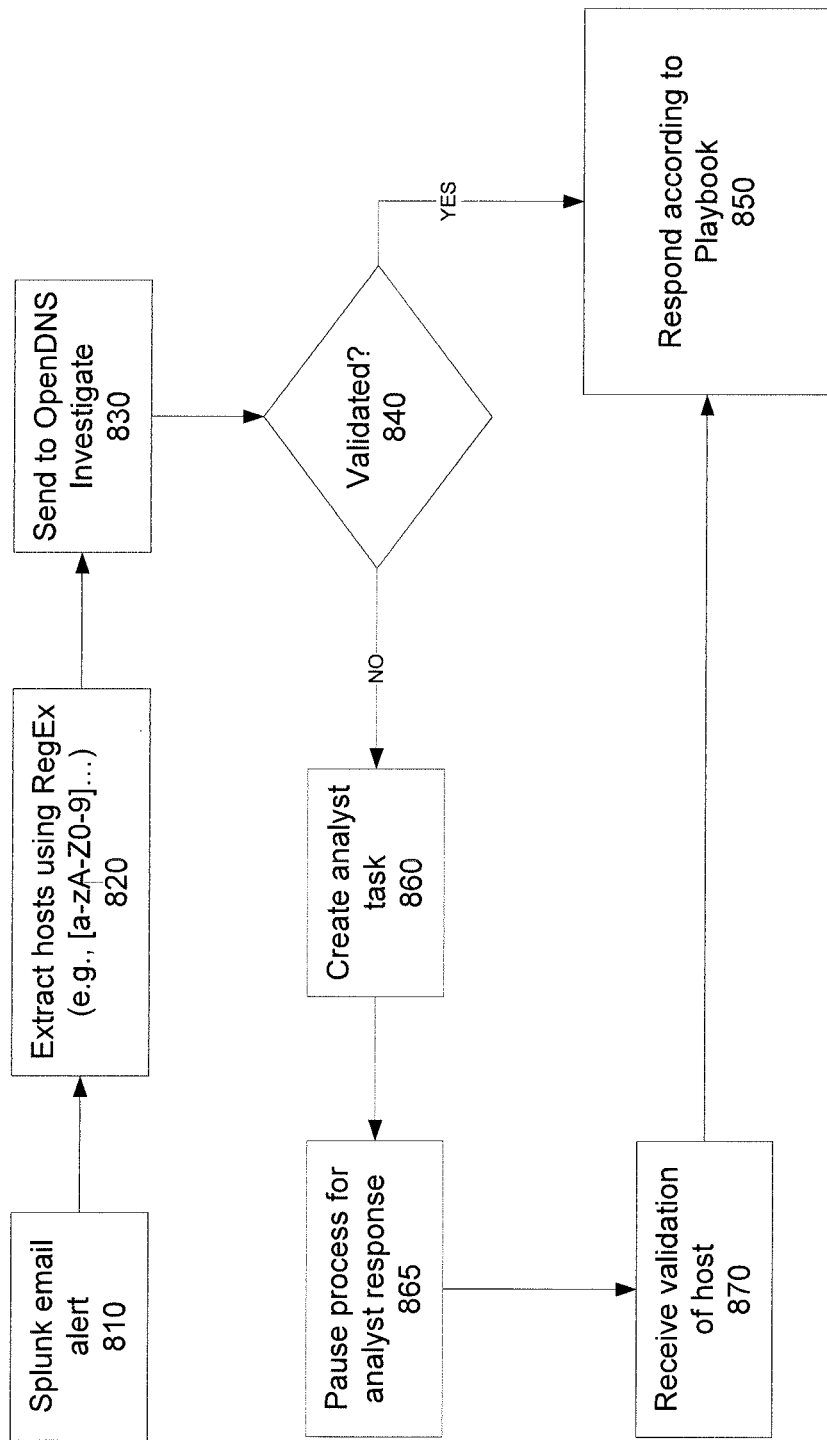
FIG. 8 illustrates an example of the orchestrated process according to a Playbook when the execution trigger is sending an email, according to implementations disclosed herein.

FIG. 8 illustrates an example of the orchestrated process according to a Playbook when the execution trigger is sending an email, according to implementations disclosed herein. In this example, Splunk 810 may be configured to send an alert of a new email to the SIEM, and the hosts embedded in the email can be extracted using a RegEx filter at 820. These hosts may be sent to a threat intelligence product at 830 (e.g., OpenDNS Investigate). If the threat intelligence product validates the host as malicious or otherwise a threat at 840, a security response may be automatically implemented at 850. If the threat intelligence product cannot validate the host at 840, an analyst task may be created at 860, and the orchestration process may be paused at 865 until an analyst can validate the threat. Once an analyst validates a threat at 870, for example the system receives an indication that the threat is validated, the orchestrated process may resume at 880 for an automated response according to the Playbook at 850. The orchestrated response, or Playbook, may be configurable via a user interface that is displayed to the user when the user is logged into the disclosed system. The user interface may permit dynamic configuration of the orchestrated process according to different trigger events and different criteria. The user interface, for example, may appear similar to the decision tree example illustrated in FIG. 8.

Figure 9:
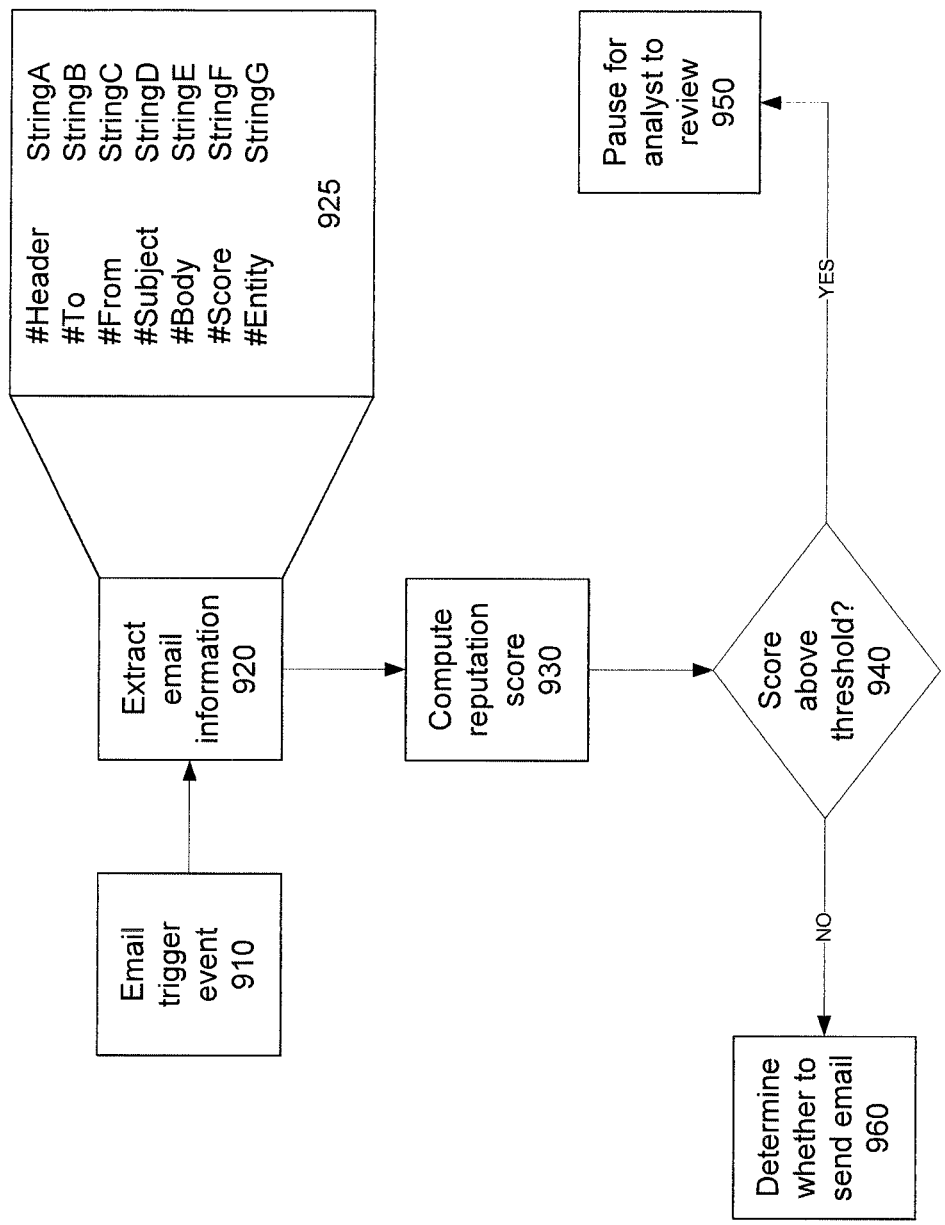
FIG. 9 is an example of different information types that can be extracted from email for determining how to respond via the orchestrated process.

FIG. 9 is an example of different information types that can be extracted from email for determining how to respond via the orchestrated process. An email may be received by the system, which may be identified as a part of the orchestrated response as a trigger event at 910. The system may be implemented on computer hardware such as the server architecture illustrated in FIG. 2. The email may be extracted for information at 920 by the system using, for example Regex, as a part of the orchestrated response. An example of the extracted information is provided in 925. A reputation score for the email may be determined according to the processes described earlier at 930. At 940, the system may determine whether the score exceeds a certain threshold. If the score exceeds a specified threshold at 950, the email may be classified as a high-risk threat, and the email can be sent to an analyst for further investigation such as the process disclosed in FIG. 8. If the score is below a certain threshold, the email can be processed as a low-risk threat according to an orchestrated threat model process such as sending it to an enrichment source or OpenDNS Investigate at 960. For example, a part of the orchestrated response may include extracting information from the email for a filtering process that determines whether the email should be evaluated under a manual or orchestrated process, such as # to, # from, # subject, # body, among others. In some instances at 960, the orchestrated response may be to send the email to the end user (e.g., intended recipient thereof).

By automatic security responses and updates, the orchestrated process disclosed herein leverages existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Figure 10A:
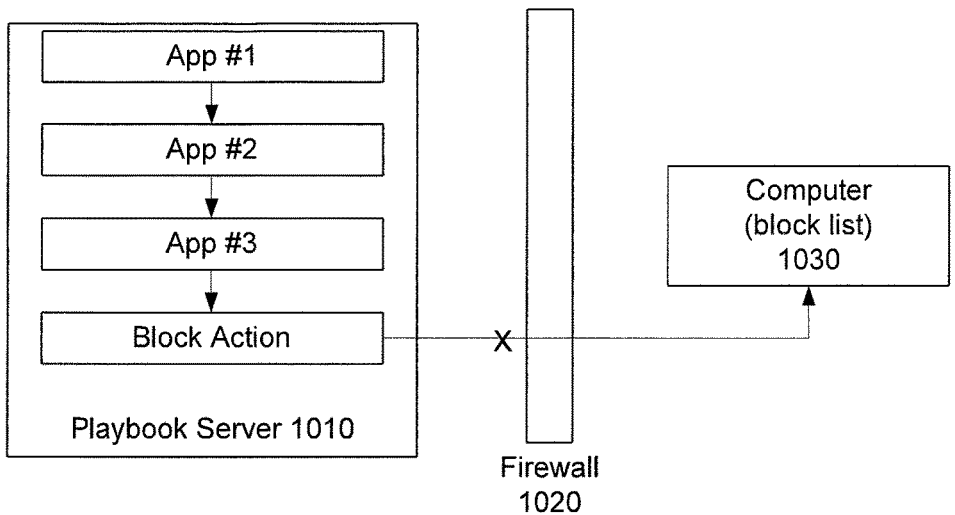
FIG. 10A illustrates an example of a Playbook server 1010 with multiple applications that form a block action as part of an orchestrated response.

As disclosed herein, an issue with current Playbook processes, is that they are unable to send instructions or otherwise direct computer hardware inside of a firewall to perform specific actions. That is, the Playbook process or orchestrated response may be stored on a system 1010 that is external relative to the firewall 1020. FIG. 10A illustrates an example of a Playbook server 1010 with multiple applications that form a block action as part of an orchestrated response. Typically, a firewall 1020 can prevent the block action from being sent directly to the computer 1030 inside the firewall 1020.

Figure 10B:
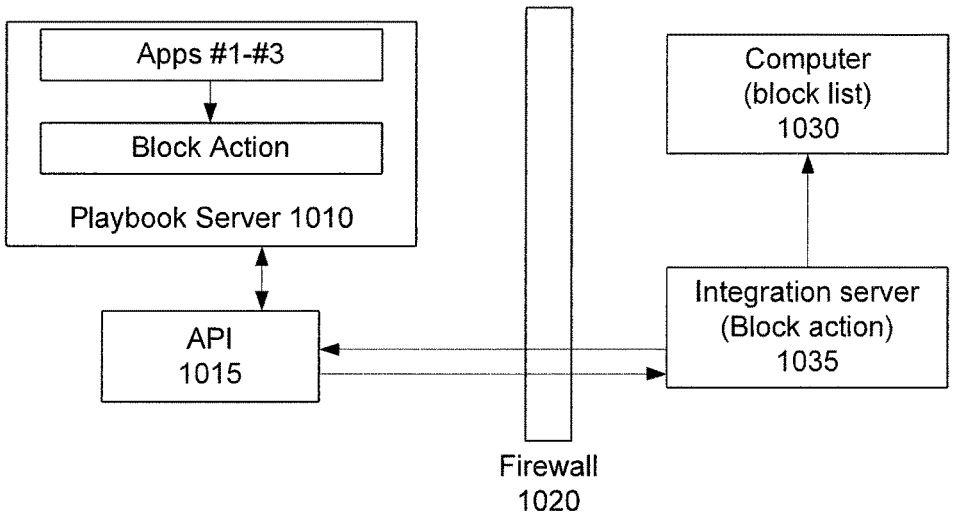
FIG. 10B illustrates an example process whereby the block action for each application on the Playbook server 1010 is associated with a tag.

FIG. 10B illustrates an example process whereby the block action for each application on the Playbook server 1010 is associated with a tag. The tag may be applied to the data to allow the Playbook actions to be applied by the integration server at a future time. The Playbook server 1010 may not otherwise have access to a user's network. An integration server 1035 placed inside the firewall can periodically poll the API 1015 to determine whether there are any applications queued for the block action on the Playbook server with the tag and, if so, the integration server 1035 may download the applications that form the block action as part of the orchestrated response. The applications may then be distributed for execution to the computer(s) 1030 that are a part of the network that the firewall 1020 protects. Thus, the implementation in FIG. 10B can poll the API at predetermined intervals for a tag but does not allow Playbook actions to occur directly inside of a user's network when it is behind a firewall.

Figure 10C:
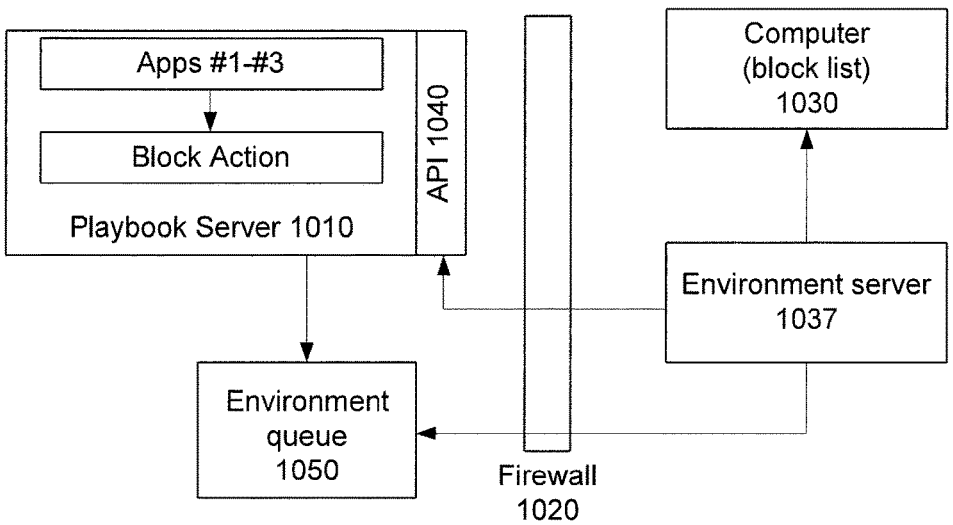
FIG. 10C illustrates an example process whereby a persistent connection to an external environment queue is maintained by a server positioned inside the firewall, which provides for real-time updating.

FIG. 10C illustrates an example process whereby a persistent connection to an external environment queue is maintained by a server positioned inside the firewall, which provides for real-time updating. Such a feature may be critical for zero day attacks, or other highly malicious attacks. In the configuration illustrated in 10C, the block action may be sent to an environment queue, which may be a command queue, and be implemented as a database, for example. The environment server 1037 may maintain a persistent connection to the environment queue 1050. Once the environment server 1037 has obtained the black action commands from the environment queue 1050, and/or once it has distributed such commands to the appropriate networked devices (e.g., 1030), the environment server 1037 may transmit an indication that it has obtained and/or executed the block action commands to the Playbook server 1010 via a Playbook API 1040. The transmission may include an indication of which commands were obtained, what action was taken inside the firewall, and/or a timestamp of when the environment queue commands were obtained. The Playbook server 1010, therefore, is able to execute actions across the firewall 1020 in real-time. The environment server 1037 differs from the integration server because it can operate in real-time and take action directly inside of the user's network even though it is behind the firewall 1020. Furthermore, because the environment server reports out the execution status, as described below with regard to FIG. 12, the user managing the network can receive information about the status of an orchestrated response via the cybersecurity threat intelligence system, for example.

Figure 11:
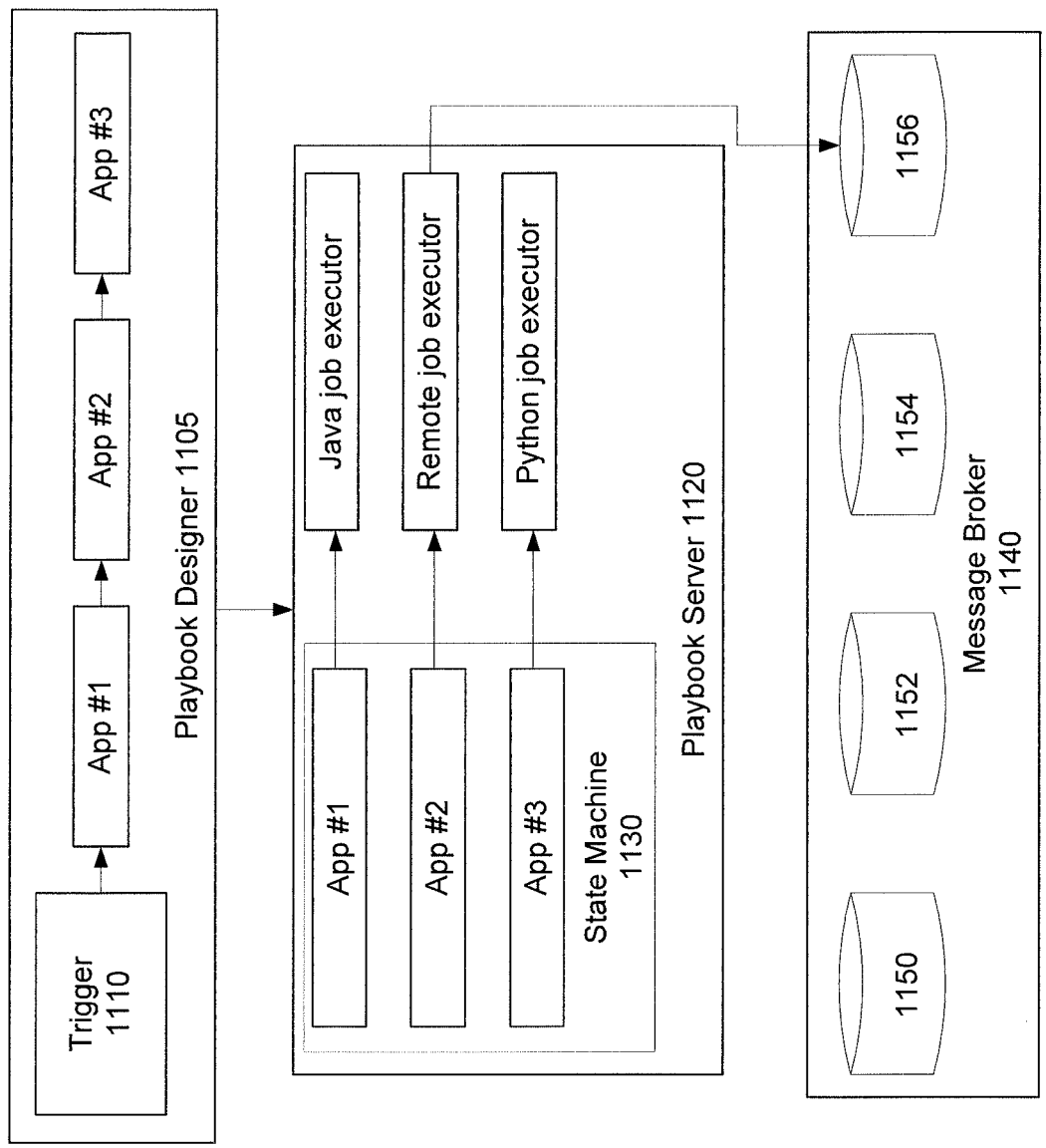
FIG. 11 is an example overview of the server architecture upon which the system may be implemented.

FIG. 11 is an example overview of the server architecture upon which the system may be implemented. A Playbook designer application 1105 may be utilized to establish the applications (e.g., Apps #1 to #3) to execute in response to a trigger 110 as a part of an orchestrated response. A state machine 1130 may have the three applications that form the response to the trigger stored on the Playbook server 1120. Each application may be executed for different programming environments (e.g., Java, python, etc.). The message broker 1140 may indicate the available environments 1150, 1152, 1154, 1156, and the indicated application may be delivered to a specific environment 1156 that is serving a particular user or network.

For example, as a Playbook executes, and different applications associated with the Playbook execute, a user may desire to execute specific applications, such as a block action that must be executed behind the user's firewall. Not every application may be a part of the block action. As an example, some of the applications may be a part of the logic or decision making with regard to whether or not to block a threat or trigger event. If it is determined to execute a block action, such action may be executed inside of an environment that has the ability to do so. The queues on the messages broker 1040 may represent a place to queue up processes or applications for execution for an environment. This may allow user's network to become disconnected without losing actions or applications that need to be executed inside the environment. It can also improve scalability and availability.

Figure 12:
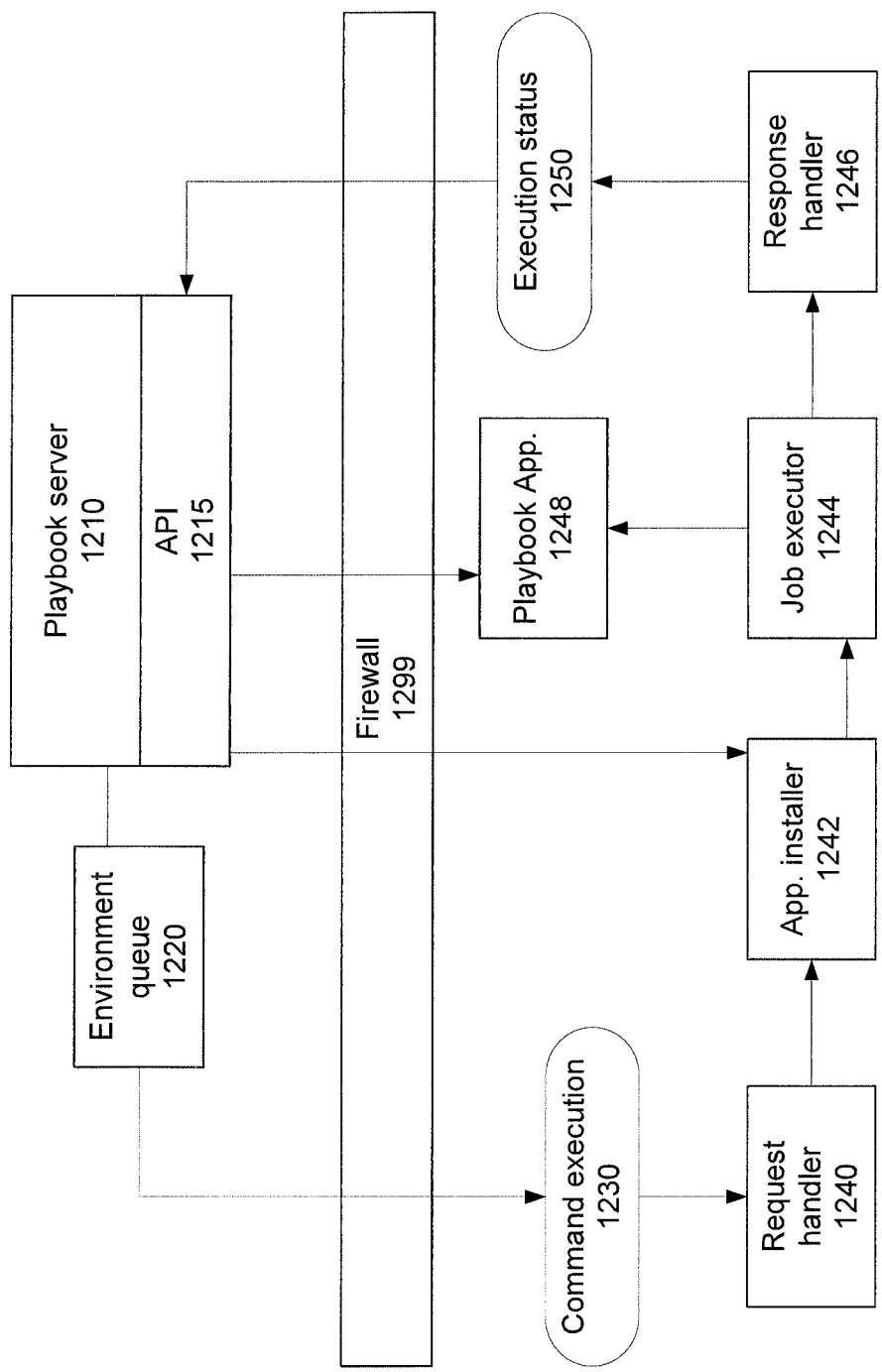
FIG. 12 is an example implementation of the relay execution lifecycle between a block action and when the environment server sends out an execution status to the Playbook server.

FIG. 12 is an example implementation of the relay execution lifecycle between a block action and when the environment server sends out an execution status to the Playbook server. The Playbook server 1210 may be operably connected to an API 1215 as well as the environment queue 1220. The environment queue 1220 may store commands or applications for execution by a computer system inside a firewall 1299. Command execution 1230 may initiate the orchestrated response to a threat. The request handler 1240 may analyze the action and determine whether it should execute, and if so, how it should execute. The application installer 1242 may download and install an application that needs to be executed locally and that may not be currently installed or available. The application installer 1242 may automatically request the application 1248 directly from the Playbook server 1210 via the API 1215 and automatically install the application 1248. The job executor 1244 may refer to code that initiates that application 1248 and monitors the application 1248 while it is running. The response handler 1246 may collect exit information about the application 1248 such as completion data. The execution status 1250 may refer to sending the status of the application 1248 back to the Playbook server 1210 so that it can be viewed on the server 1210 by a user, for example.

Figure 13:
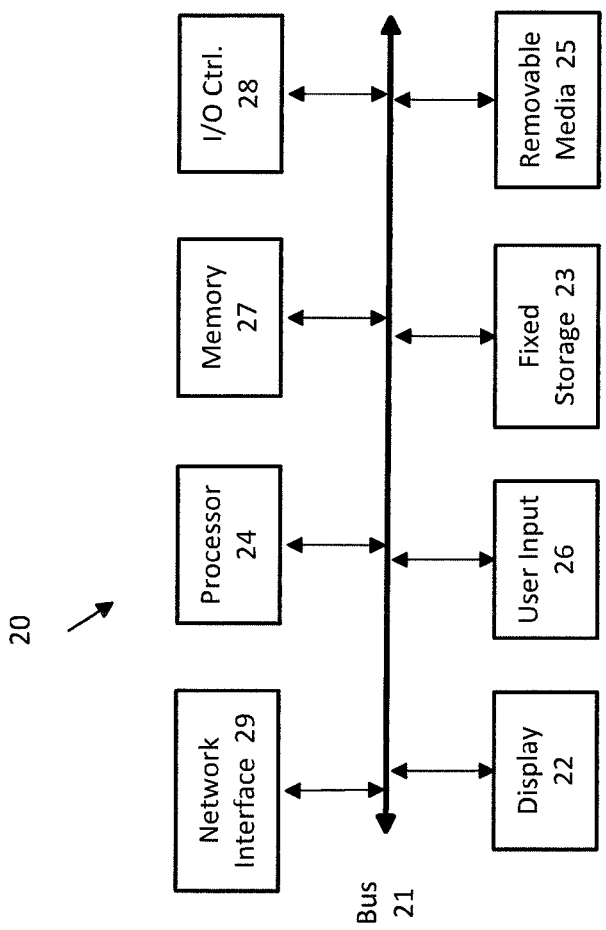
FIG. 13 is an example computer (e.g., server or local computer) suitable for implementing embodiments of the presently disclosed subject matter.

Embodiments of the presently disclosed subject matter may be implemented in and used with a variety of component and network architectures. FIG. 13 is an example computer 20 (e.g., a cloud-based server, server, database, smartphone, tablet, laptop, mobile device, server) suitable for implementing embodiments of the presently disclosed subject matter. The computer 20 can include a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. A server (e.g., a cloud-based server) may be implemented as a cluster of computers 20, each of which may contain some or all of the aforementioned components.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, removable media 25, or on a remote storage location.

Figure 14:
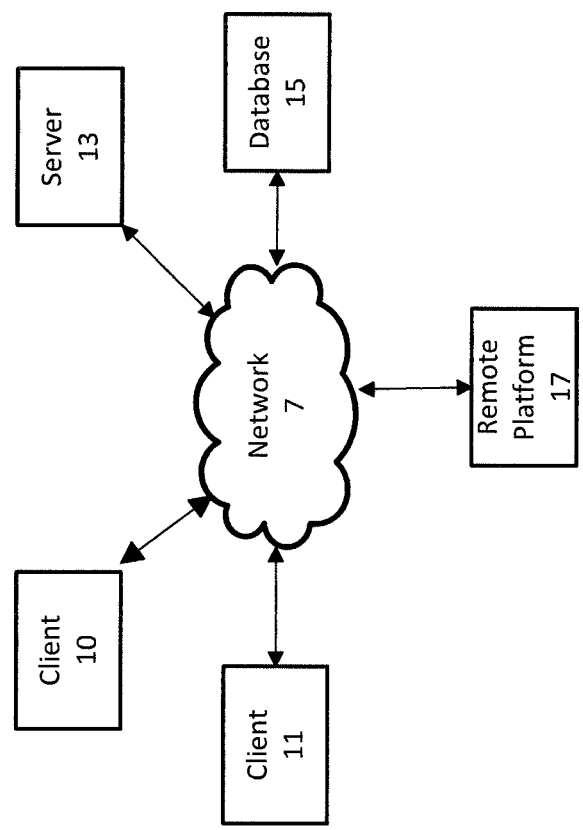
FIG. 14 shows an example network arrangement according to an embodiment of the disclosed subject matter.

FIG. 14 shows an example network arrangement according to an embodiment of the disclosed subject matter. One or more clients 10, 11, such as local computers, mobile devices, smartphones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
   a non-transitory memory configured to store at least threat model data; and
   one or more hardware processors coupled to the non-transitory memory and configured to read instructions from the non-transitory memory to cause the system to perform operations comprising:
   collecting a plurality of threat models used to score and classify new potential threat models, each threat model identifying a prior identified cybersecurity threat;
   obtaining data of a potential cybersecurity threat, the data of the potential cybersecurity threat including a number of observations, a number of false positives, and a number of page views for the potential cybersecurity threat, the potential cybersecurity threat being identified in the based on at least one threat model of the plurality of threat models that identifies a prior identified cybersecurity threat;
receiving, over a communications network, a plurality of data feeds, the plurality of data feeds including one or more of a known bad data feed that constitute known cybersecurity threats, one or more known good data feed that do not constitute known cybersecurity threats, and one or more enrichment data feeds, wherein the plurality of data feeds comprise a plurality of indicators of compromise (IOC);
computing, for each known bad data feed, a deprecated confidence value which deprecates over time;
determining, for each IOC, a weighted criticality score of the potential cybersecurity threat based on the data of the potential cybersecurity threat;
mapping the weighted criticality score of the potential cybersecurity threat to a corresponding point value;
determining an aggregated score comprising at least the corresponding point value;
determining a reputation score of the potential cybersecurity threat as the product of a scale factor and the aggregated score, divided by a maximum point total; and
performing a network countermeasure response based upon the reputation score of the potential cybersecurity threat.

2. The system of claim 1, wherein the deprecated confidence value is set to zero when a time period cut-off is exceeded.

3. The system of claim 1, further comprising:
determining that an indicator in one of the plurality of data feeds is deprecated based upon the deprecated confidence value.

4. The system of claim 1, wherein the corresponding point value has a maximum threshold value.

5. The system of claim 1, wherein the aggregated score comprises additional points when the IOC is present in more than one of the plurality of bad data feeds.

6. The system of claim 1, wherein the aggregated score comprises points computed for each of observations of the potential cybersecurity threat, false positives of the potential cybersecurity threat, and page views of the potential cybersecurity threat.

7. The system of claim 1, wherein performing the network countermeasure response based upon the reputation score includes generating an alert for an analyst.

8. The system of claim 1, further comprising:
determining whether the reputation score is above a trigger value to initiate the network countermeasure response.

9. A computer-implemented method, comprising:
collecting a plurality of threat models used to score and classify new potential threat models, each threat model identifying a prior identified cybersecurity threat;
obtaining data of a potential cybersecurity threat, the data of the potential cybersecurity threat including a number of observations, a number of false positives, and a number of page views for the potential cybersecurity threat, the potential cybersecurity threat being identified in the based on at least one threat model of the plurality of threat models that identifies a prior identified cybersecurity threat;
receiving, over a communications network, a plurality of data feeds, the plurality of data feeds including one or more of a known bad data feed that constitute known cybersecurity threats, one or more known good data feed that do not constitute known cybersecurity threats, and one or more enrichment data feeds, wherein the plurality of data feeds comprise a plurality of indicators of compromise (IOC);
computing, for each known bad data feed, a deprecated confidence value which deprecates over time;
determining, for each IOC, a weighted criticality score of the potential cybersecurity threat based on the data of the potential cybersecurity threat;
mapping the weighted criticality score of the potential cybersecurity threat to a corresponding point value;
determining an aggregated score comprising at least the corresponding point value;
determining a reputation score of the potential cybersecurity threat as the product of a scale factor and the aggregated score, divided by a maximum point total; and
performing a network countermeasure response based upon the reputation score of the potential cybersecurity threat.

10. The computer-implemented method of claim 9, wherein the deprecated confidence value is set to zero when a time period cut-off is exceeded.

11. The computer-implemented method of claim 9, further comprising:
determining that an indicator in one of the plurality of data feeds is deprecated based upon the deprecated confidence value.

12. The computer-implemented method of claim 9, wherein the corresponding point value has a maximum threshold value.

13. The computer-implemented method of claim 9, wherein the aggregated score comprises additional points when the IOC is present in more than one of the plurality of bad data feeds.

14. The computer-implemented method of claim 9, wherein the aggregated score comprises points computed for each of observations of the potential cybersecurity threat, false positives of the potential cybersecurity threat, and page views of the potential cybersecurity threat.

15. The computer-implemented method of claim 9, wherein performing the network countermeasure response based upon the reputation score includes generating an alert for an analyst.

16. The computer-implemented method of claim 9, further comprising:
determining whether the reputation score is above a trigger value to initiate the network countermeasure response.

17. A non-transitory computer readable medium having stored thereon computer readable instructions that are executable to cause one or more processors to perform operations, comprising:
collecting a plurality of threat models used to score and classify new potential threat models, each threat model identifying a prior identified cybersecurity threat;
obtaining data of a potential cybersecurity threat, the data of the potential cybersecurity threat including a number of observations, a number of false positives, and a number of page views for the potential cybersecurity threat, the potential cybersecurity threat being identified in the based on at least one threat model of the plurality of threat models that identifies a prior identified cybersecurity threat;
receiving, over a communications network, a plurality of data feeds, the plurality of data feeds including one or more of a known bad data feed that constitute known cybersecurity threats, one or more known good data feed that do not constitute known cybersecurity threats, and one or more enrichment data feeds, wherein the plurality of data feeds comprise a plurality of indicators of compromise (IOC);

computing, for each known bad data feed, a deprecated confidence value which deprecates over time;

determining, for each IOC, a weighted criticality score of the potential cybersecurity threat based on the data of the potential cybersecurity threat;

mapping the weighted criticality score of the potential cybersecurity threat to a corresponding point value;

determining an aggregated score comprising at least the corresponding point value;

determining a reputation score of the potential cybersecurity threat as the product of a scale factor and the aggregated score, divided by a maximum point total; and performing a network countermeasure response based upon the reputation score of the potential cybersecurity threat.

18. The non-transitory computer readable medium of claim 17, wherein performing the network countermeasure response based upon the reputation score includes generating an alert for an analyst.

\* \* \* \* \*